March 12, 1968   R. COLMAN   3,373,315
FLASHER CIRCUIT FOR ELECTROLUMINESCENT CELLS
Filed Oct. 23, 1965

INVENTOR
Robert Colman

BY  *Jay M. Cantor*
ATTORNEY

United States Patent Office 3,373,315
Patented Mar. 12, 1968

3,373,315
FLASHER CIRCUIT FOR ELECTROLUMINESCENT CELLS
Robert Colman, 421 E. 89th St., New York, N.Y. 10021
Filed Oct. 23, 1965, Ser. No. 503,835
5 Claims. (Cl. 315—240)

ABSTRACT OF THE DISCLOSURE

A high efficiency power supply which converts a DC voltage to an AC voltage for driving light sources and other loads.

---

This invention relates generally to a flasher circuit for electroluminescent cells and, more particularly, to a lightweight, low-powered, battery-operable and portable flashing electroluminescent cell system.

Flasher circuits have been well known in the prior art and many such circuits exist. The patent to Root— (2,829,257) discloses one typical prior art flashing circuit. The prior art flasher circuits, when adapted for portable battery operation, have always required high duty cycles with consequent high battery drain and low battery life. The prior art portable circuits, when transistorized, have also displayed high leakage currents, thereby also displaying high battery drain and low battery life. The prior art flasher circuits have also required high power for maximum brightness and have been relatively expensive to produce.

In accordance with the present invention, the above mentioned problems which are inherent in the prior art are overcome, briefly, by providing an electroluminescent cell power system having a flashing circuit which includes a pair of complementary transistors. The transistors are connected so that when both transistors simultaneously turn on their combined current gain may be utilized to generate high peak leading edge current pulses at a desired system flashing frequency. The leakage current is minimized and the current requirement for maximum brightness is also minimized; consequently, battery drain is minimized and provides for long battery life. This feature is provided by utilizing one of said transistors in the circuit in an inverted manner from that in which the transistor would normally be used.

It is therefore an object of this invention to provide an electroluminescent cell power system having a pair of complementary-type transistors, one of which is connected in an inverted configuration to provide low leakage current.

It is a further object of this invention to provide an electroluminescent cell power system having low current requirement for maximum cell brightness.

It is still a further object of this invention to provide a portable, battery-operated electroluminescent cell power system having long battery life.

It is a yet further object of this invention to provide an electroluminescent cell power system having a minimum number of components which is relatively inexpensive to produce.

The above objects and still further objects of the invention will become apparent to those skilled in the art from the following description of a specific preferred embodiment of the invention, which is provided by way of example and not by way of limitation, wherein.

Figure 1:
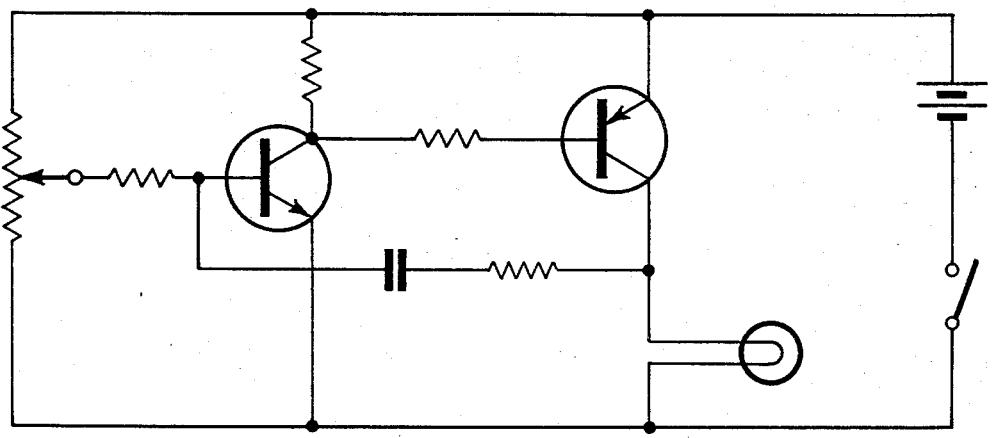
FIGURE 1 is a circuit diagram of a prior art flasher circuit.

Referring to FIGURE 1, there is shown a prior art flasher circuit as described in "Performance-Tested Transistor Circuits"—Sylvania Electric Products Incorporated—copyright 1958, pages 16 and 17—first edition. Circuits of this type have been quite useful as flasher circuits, both with the use of incandescent bulbs as described in the above publication or with electroluminescent cells. It is well known in the art that the lamp of FIGURE 1 can be replaced with a transformer to provide the higher voltage required by electroluminescent cells. The use of such transformers is clearly shown in the patent to Brainerd, Patent No. 3,026,440. Of course, this substitution is well known in the art and further discussion of same is not required.

The flasher circuit of FIGURE 1 includes a timing circuit to provide the proper flasher frequency connected in the feed-back circuit to the base of one transistor. While this circuit provides good flashing results, circuits of this type are expensive and require high power for maximum brightness and have relatively high duty cycles. It has therefore been found that a circuit as represented in FIGURE 1 is not highly desirable where portability and battery operation are required, primarily due to the high power requirement and the accompanying relatively high rate of battery discharge. Such circuits do not allow extended use of the device without changing or recharging of the batteries relatively frequently.

Figure 2:
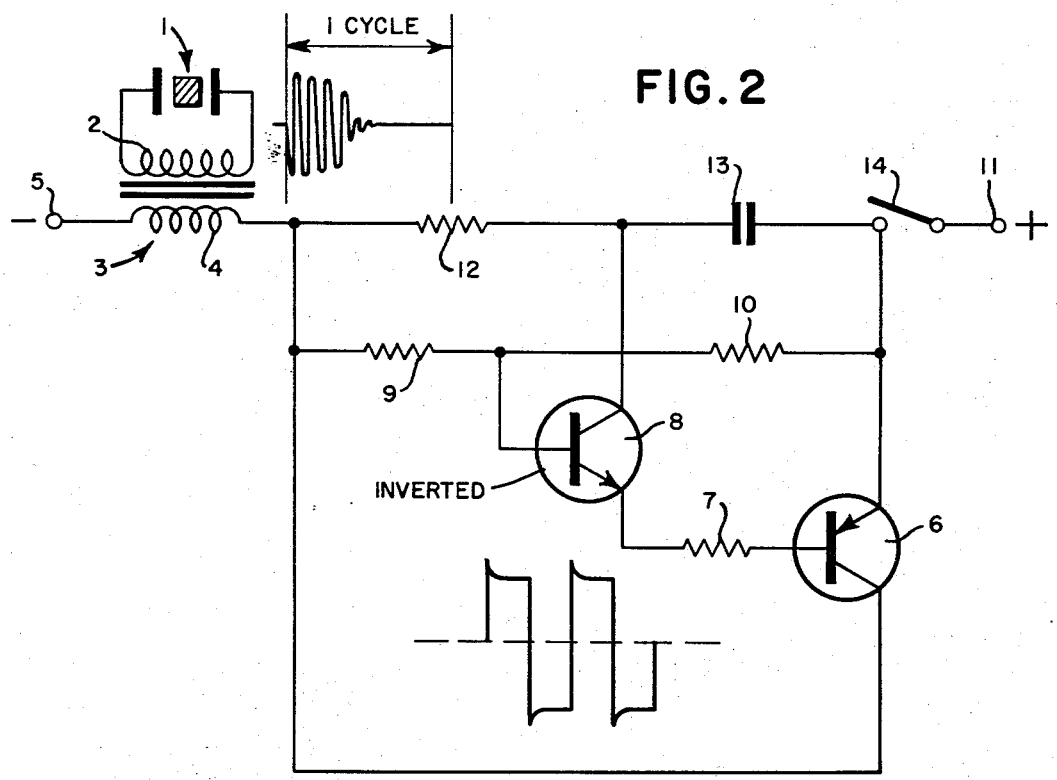
FIGURE 2 is a circuit diagram of the preferred embodiment of the present invention.

The problems inherent in the prior art are overcome in accordance with the present invention as represented in FIGURE 2.

Referring now to FIGURE 2, there is shown an electroluminescent cell 1 coupled to the secondary winding 2 of a transformer 3 to provide a series tuned circuit. The primary winding 4 of the transformer 3 is coupled between the negative pole 5 of a DC battery and the collector electrode of a PNP power transistor 6. The collector electrode of transistor 6 is coupled through a resistor 9 to the base electrode of NPN transistor 8 and through a resistor 12 to the collector electrode of trasistor 8. The emitter electrode of the transistor 6 is coupled through a resistor 10 to the base electrode of transistor 8. The base electrode of transistor 6 is coupled to the emitter electrode of transistor 8 through a resistor 7. The collector electrode of transistor 8 is coupled through a capacitor 13 to the positive battery terminal 11 via a switch 14.

The operation of the above described circuit is substantially as follows:

Assume that capacitor 13 is initially uncharged and that the switch 14 is then closed. Current will then travel from the positive battery terminal through the voltage divider composed of resistors 9 and 10 to the negative battery terminal, such current being very small and biasing the base of transistor 8 to prevent dynamic current flow from the emitter to the collector thereof. This results in only a minute static current flow in the primary circuit of the pulse transformer 3 which is insufficient to cause the electroluminescent cell 1 to light. During this period, there is also a dynamic or transient current flow through pulse transformer primary 4, resistor 12 and capacitor 13 which charges the capacitor 13. The voltage divider composed of resistors 9 and 10 is designed so that it will not sustain saturation of transistor 8. At this time, transistor 8 is biased in the off or non-conducting state with only minimal static current flow therethrough due to the conditions of bias on the base electrode thereof.

When capacitor 13 has become sufficiently charged, the potential difference across the plates thereof increases and also the potential difference across the voltage divider composed of resistors 9 and 10 increases. The potential at the base of NPN transistor 8 therefore rises to a value relative to the collector electrode thereof sufficient to trigger the transistor on. At this point, capacitor 13 is discharged through the emitter-collector circuit of NPN transistor 8, through resistor 7 and through the base-emitter circuit of PNP transistor 6 toward the positive battery terminal 11. This discharge current through the base-emitter circuit of transistor 6 biases this transistor in a forward direction, thereby making this transistor conduct and allowing a current pulse to flow through transformer winding 4 and transistor 6. This current pulse is of sufficient amplitude to induce a voltage in the secondary winding 2 which will pulse the electroluminescent cell into the luminescent state. The electroluminescent cell 1 will remain on during the interval of capacitor discharge.

After the capacitor has discharged sufficiently, the bias applied to the transistor 6 decreases sufficiently to cut off the dynamic current through the transformer primary, thereby causing the electroluminescent cell to be extinguished. Transistor 8 also turns off due to a decrease base-collector voltage. With the transformer primary dynamic current off, capacitor 13 therefore again begins to charge and the sequence as described above is repeated continually to create intermittent flashes of the electroluminescent cell.

The rate of charge of capacitor 13 is controlled by the value of resistor 12 and the resistance of transformer primary winding 4. The rate of discharge of capacitor 13 is determined by the value of resistor 7. It should be noted that the electroluminescent cell will not have current supplied thereto in a steady state since, during operation of the circuit in the on state, the only power available to the transistors is through capacitor 13. Thus, there is little danger of the electroluminescent cell staying on continually. The interval during which the electroluminescent cell remains on and off during the flashing cycle as well as the frequency of the flash cycle is determined by the choice of the values of the resistors 12 and 7 together with the capacitance of capacitor 13. The operation of this unit is also dependent upon the $h_{FE}$ of both transistors 8 and 6.

In the preferred embodiment of the invention as set forth in FIGURE 2, transistor 8 is operated in the inverted configuration for lower $h_{FE}$ and lower leakage current. Transistors 8 and 6 are preferably selected such that the $h_{FE}$ product of the pair of transistors 6 and 8 is between 500 and 1000. Of course, it is understood that the two transistors 6 and 8 could be interchanged whereby transistor 6 is an NPN transistor and transistor 8 is a PNP transistor and circuits of this type are contemplated in accordance with the present invention.

During operation of the circuit as described in FIGURE 2, the wave shape of the voltage in the secondary circuit of the transformer 3 composed of winding 2 and electroluminescent cell 1 is a tuned ringing circuit having a substantially sinusoidal wave for a portion of a cycle which then is damped as shown in FIGURE 2. During operation of the circuit, the wave shape at the emitter electrode of the transistor 6 is shown in the drawing to the left of said transistor. It will be noted that the wave shape includes a slight spike or fast rising leading edge to the square wave. This square wave pulse is especially desirable in the operation of the supply because maximum energy is available at the start of each current pulse and therefore transfers a maximum of power to the tuned circuit including the electroluminescent cell and the transformer secondary. This feature is highly desirable in portable battery-operated circuits of the subject type, especially when used with electroluminescent cells, since such electroluminescent cells require high initial starting voltages to light and lower maintaining voltage. Accordingly, it can be seen that the firing voltage, which is required for only a short period of the cycle, is provided for only such short period of the cycle, thereby saving the power which would be wasted at the trailing edge of the pulse had the pulses been square waves rather than waves with a "back porch" at lower amplitude. By decreasing the value of resistor 12, the flashing rate and, thus, the duty cycle may be increased to an on period in excess of 50%, thus permitting the use of the supply for providing the appearance of continuous illumination from the electroluminescent cell.

Component values which have been found to provide excellent results are as follows:

Transformer 3, pulse transformer with secondary approximately 500 ohms and primary approximately 8 ohms.

| | | |
|---|---|---|
| Resistor 7 | ohms | 680 |
| Resistor 9 | do | 2.2K |
| Resistor 10 | do | 6.8K |
| Resistor 12 | do | 10K |
| Capacitor 13 | microfarads | 100 |
| Transistor 6 PNP | | 2N351 |
| Transistor 8 NPN | | 2N1302 |

Although the invention has been described with respect to a specific embodiment thereof, many variations and modifications thereof will become apparent to those skilled in the art. It is therefore the intention that the appended claims be interpreted as broadly as possible in view of the prior art to encompass all such variations and modifications.

What is claimed is:

1. A flasher circuit for an electroluminescent cell, comprising a tuned circuit having a transformer secondary winding and an electroluminescent cell, a source of direct current having a positive and a negative voltage terminal, a primary winding associated with said secondary winding, one end of said primary winding being coupled to said negative voltage terminal, a first resistor coupled between the second end of said primary winding and a capacitor, said capacitor being coupled to said positive voltage terminal, a pair of resistors coupled between the second end of said primary winding and said positive voltage terminal, an NPN transistor having the base thereof coupled to the junction of said pair of resistors, the collector thereof coupled to the junction of said first resistor and said capacitor, a PNP transistor, the base of said PNP transistor being coupled through a resistor to the emitter of said NPN transistor, the emitter of said PNP transistor being coupled to said positive voltage terminal, the collector of said PNP transistor being coupled to the junction of said first resistor and said second end of said primary wherein said NPN transistor functions as an inverted transistor winding.

2. A flasher circuit for a light source comprising a tuned circuit having a transformer secondary winding and a light source, a source of direct current having a positive and a negative voltage terminal, a primary winding associated with said secondary winding one end of said primary winding being coupled to said negative voltage terminal, a first resistor coupled between the second end of said primary winding and a capacitor, said capacitor being coupled to said positive voltage terminal, a pair of resistors coupled between the second end of said primary winding and said positive voltage terminal, a first transistor having the base thereof coupled to the junction of said pair of resistors, the collector thereof coupled to the junction of said first resistor and said capacitor, a second transistor of the opposite conductivity type to said first transistor, the base of said second transistor being coupled through a resistor to the emitter of said first transistor, the emitter of said second transistor being coupled to said positive voltage terminal, the collector of said second transistor being coupled to the junction of said first resistor and said second end of said primary winding wherein said first transistor functions as an inverted transistor.

3. A flasher circuit as set forth in claim 2, wherein the pulses provided at said primary winding have a steep short duration high voltage leading edge relative to the trailing edge thereof and said light source is an electroluminescent cell.

4. In an electronic power supply for converting a direct current into an alternating current having a complementary pair of transistors cross-coupled to form a circuit having both transistors alternately conducting and thence non-conducting for a time period determined by an R.C. time constant network coupled to said transistors, one of said transistors turning the other transistor on, thereby being a driving transistor, the emitter of the first transistor coupled to a first terminal adapted to receive a direct current voltage, the collector of the first transistor coupled to the base of the second transistor, the collector of the second transistor being connected to said R.C. time constant network, the improvement comprising the emitter of said second transistor connected to the base of said first transistor wherein said second transistor functions as an inverted transistor.

5. A flasher circuit for a light source including a transformer having a primary winding and a secondary winding, said transformer secondary winding being connected to said light source, means for generating a spike modified square wave pulse having a substantially average pulse height with a leading edge which is spike shaped and of greater amplitude than the average height of said square wave pulse connected to said primary of said transformer whereby the energy in said spiked portion of said square wave turns said light source on and said average height of said square wave sustains the on period of said light source wherein said means for generating a spike modified pulse comprises a complementary pair of cross-coupled transistors having the emitter of the first transistor connected to the base of the second transistor wherein said first transistor functions as an inverted transistor and the collector of said second transistor connected to the base of said first transistor.

References Cited

UNITED STATES PATENTS

| | | | |
|---|---|---|---|
| 2,829,257 | 4/1958 | Root | 315—200 |
| 3,003,122 | 10/1961 | Gerhard | 332—29 |

JOHN W. HUCKERT, *Primary Examiner.*

J. D. CRAIG, *Assistant Examiner.*